J. GRUNDSTROM.
CARPENTER'S TRIANGLE.
APPLICATION FILED DEC. 17, 1912.

1,106,205.

Patented Aug. 4, 1914.
2 SHEETS—SHEET 1.

Witnesses
Hugh H. Ott
E. L. Mueller

Inventor
John Grundstrom
By Victor J. Evans
Attorney

J. GRUNDSTROM.
CARPENTER'S TRIANGLE.
APPLICATION FILED DEC. 17, 1912.
1,106,205.
Patented Aug. 4, 1914.
2 SHEETS—SHEET 2.
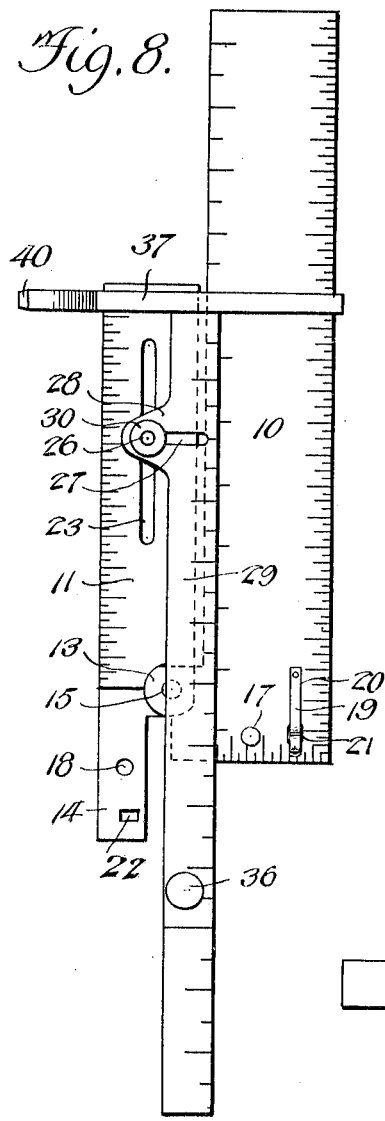
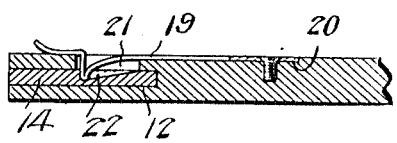
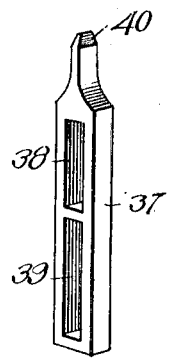
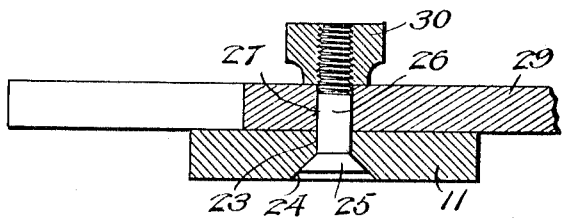
Inventor
John Grundstrom
By Victor J. Evans
Attorney
Witnesses
Hugh H. Ott
Ed Mueller

UNITED STATES PATENT OFFICE.

JOHN GRUNDSTROM, OF BULLRUN, OREGON.

CARPENTER'S TRIANGLE.

1,106,205.  Specification of Letters Patent.  Patented Aug. 4, 1914.

Application filed December 17, 1912. Serial No. 737,321.

*To all whom it may concern:*

Be it known that I, JOHN GRUNDSTROM, a citizen of the United States, residing at Bullrun, in the county of Clackamas and State of Oregon, have invented new and useful Improvements in Carpenters' Triangles, of which the following is a specification.

The general object of this invention is the provision of a carpenter's triangle having the hypotenuse thereof adjustable relative to the base and the perpendicular member whereby various angles may be obtained, said triangle being so constructed as to be rendered foldable when not in use, and to this end the invention consists in providing certain novel constructions, arrangements and combinations of devices which will be fully described hereinafter and then pointed out in the appended claims.

In carrying out the object of the invention generally stated above, it will be understood, of course, that the essential features thereof are susceptible to changes in details and structural arrangements, one preferred and practical embodiment being shown in the accompanying drawings, wherein:—

Figure 1:
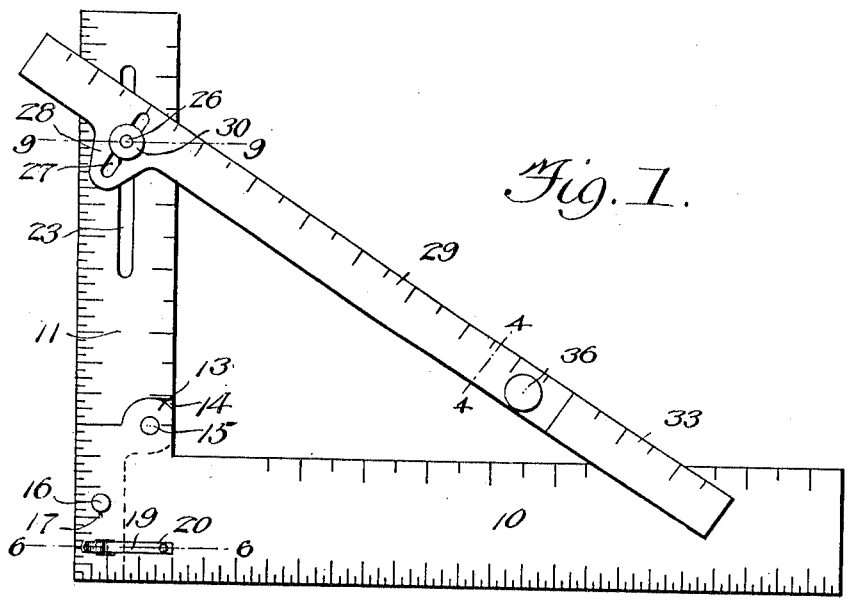
Figure 2:
Figure 3:
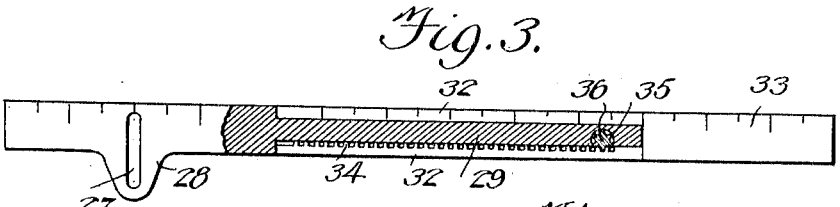
Figure 4:
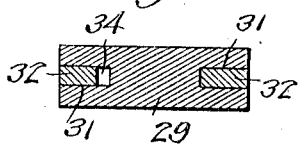
Figure 5:
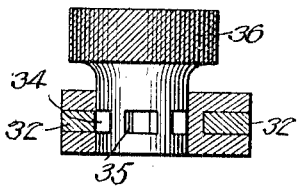

Figure 1 is a plan view of the triangle constructed in accordance with the invention. Fig. 2 is an edge elevation thereof. Fig. 3 is a detail plan view partly in section of the hypotenuse and of the adjustable section of the hypotenuse. Fig. 4 is a transverse section on the line 4—4 of Fig. 1. Fig. 5 is a detail view of an adjusting pinion used in connection with the adjustable section illustrated in Fig. 3. Fig. 6 is a detail sectional view on the line 6—6 of Fig. 1, showing the means for holding the base and the perpendicular member of the triangle in extended position. Fig. 7 is a detail perspective view of a locking element used for retaining the base and perpendicular members in a folded position. Fig. 8 is a plan view of the triangle in a folded position. Fig. 9 is a transverse section on the line 9—9 of Fig. 1 showing the manner of connecting the hypotenuse to the perpendicular member.

Referring more particularly to the accompanying drawings in which like reference characters designate similar parts it will be seen that the invention comprises a base member 10 and a perpendicular member 11 pivotally connected thereto. The base member 10 is provided at its pivoted end with a bifurcation 12 including the substantially semi-circular ears 13 which are adapted to receive therebetween the reduced extension 14 of the perpendicular member 11 when the said members are in their extended or operative position, a pin 15 being passed transversely through the ears 13 and the reduced extension 14 whereby the said members are properly pivoted together. The members 10 and 11 are retained in their relative extended positions by means of a pin 16 which extends through the openings 17 formed in the bifurcated end 12 of the base member and the opening 18 formed in the reduced extension 14 of the perpendicular member 11.

In the event that the pin 16 becomes lost or misplaced, an additional means is provided for retaining the members in their extended position and includes a leaf spring 19 one end of which is secured in an elongated recess 20 in the base member 10 while the other end is bent to first extend through an opening 21 contiguous to the recess 20 and engage a suitable notch 22 in the reduced end 14 of the perpendicular member 11, said notch being adapted to register with the opening 21 when the members are in their extended position.

The perpendicular member 11 is provided with an elongated slot 23 having the bottom portion of its longitudinal walls beveled as indicated at 24 in order to retain the enlarged head 25 of the pivot bolt 26 in engagement with said slot. The pivot bolt 26 is adapted to extend through the transverse slot 27 formed in the enlarged end 28 of the hypotenuse member 29 of the triangle. The said bolt 26 is threaded upon its upper end in order to receive the nut 30 whereby the hypotenuse member 29 may be secured in an adjusted position.

For a major portion of the length of the hypotenuse member 29 the same is provided upon the longitudinal edges with the oppositely disposed guiding grooves 31 which are adapted to receive the reduced longitudinally extending arms 32 of the longitudinally adjustable section 33 of the said hypotenuse member. One of the arms 32 is provided with the internal rack teeth 34 which are adapted to be engaged by the coöperating parts 35 of the pinion 36, the latter extending through a transverse opening adjacent one end of the member 29, said opening communicating with the groove 31 which receives the arm 32 upon which the rack teeth 34 are formed. It will thus be seen that upon rotation of the pinion 36, the adjustable section 33 may be moved inwardly or outwardly relative to the member 29 whenever desired.

By removing the pin 16 and disengaging the spring 19 from the notch 22, it will be seen that the base and perpendicular members 10 and 11 may be swung to the position illustrated in Fig. 8 of the drawings and said members are retained in this position by means of a locking element 37 which comprises an elongated strip having a pair of openings 38 and 39 therein, said openings being of such a size as to receive, respectively, the base member 10 and the perpendicular member 12. One end of the locking element 37 is tapered as indicated at 40 whereby the same may be utilized as a screw driver.

What is claimed is:—

1. A device of the class described comprising a base member, a perpendicular member pivotally connected thereto, means including a leaf spring for retaining said members in their extended position, a hypotenuse member formed with a transverse slot, said perpendicular member being formed with a longitudinally extending slot, means coöperating with both the said slots to connect the hypotenuse member and the perpendicular member for relative adjustment, said hypotenuse member including a longitudinally adjustable section, and means including a pinion for adjusting said section.

2. A carpenter's triangle including a base member, a perpendicular member pivotally connected thereto, means for retaining said members in their extended position, said perpendicular member being formed with a longitudinally extending slot, a hypotenuse member formed with an enlargement intermediate its ends, said hypotenuse member being formed with a slot arranged transversely thereof and extending into the enlargement, and fastening means passing through the slots of the hypotenuse member and perpendicular member, whereby the hypotenuse member may be adjusted longitudinally and obliquely with respect to the perpendicular member.

In testimony whereof I affix my signature in presence of two witnesses.

JOHN GRUNDSTROM.

Witnesses:
J. H. INGRAM,
SILAS SAGE.

---

Copies of this patent may be obtained for five cents each, by addressing the "Commissioner of Patents, Washington, D. C."